US 10,088,591 B2

(12) United States Patent
Manning

(10) Patent No.: US 10,088,591 B2
(45) Date of Patent: *Oct. 2, 2018

(54) SYSTEM AND METHOD FOR LOCATING AN UNDERGROUND UTILITY

(71) Applicant: McLaughlin Group, Inc., Greenville, SC (US)

(72) Inventor: Matthew E. Manning, Laurens, SC (US)

(73) Assignee: McLaughlin Group, Inc., Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,223

(22) Filed: Dec. 29, 2017

(65) Prior Publication Data

US 2018/0120467 A1  May 3, 2018

Related U.S. Application Data

(63) Continuation of application No. 14/956,220, filed on Dec. 1, 2015, now Pat. No. 9,857,494.

(51) Int. Cl.
*G01V 3/08* (2006.01)
*G01V 3/165* (2006.01)

(52) U.S. Cl.
CPC .............. *G01V 3/081* (2013.01); *G01V 3/165* (2013.01)

(58) Field of Classification Search
CPC .................................. G01V 3/81; G01V 3/165
See application file for complete search history.

(56) References Cited

U.S. PATENT DOCUMENTS

| | | |
|---|---|---|
| 4,387,340 A | 6/1983 | Peterman |
| 4,520,317 A | 5/1985 | Peterman |
| 4,829,284 A | 5/1989 | Pfaff |
| 4,896,117 A | 1/1990 | Floweredew et al. |
| 5,043,666 A | 8/1991 | Tavernetti et al. |
| 5,210,497 A | 5/1993 | Regini |
| 5,260,659 A | 11/1993 | Flowerdew et al. |
| 5,337,002 A | 8/1994 | Mercer |
| 5,469,155 A | 11/1995 | Archambeault et al. |
| 5,711,381 A | 1/1998 | Archambeault et al. |
| 6,127,827 A | 10/2000 | Lewis |
| 6,130,539 A | 10/2000 | Polak |
| 6,268,731 B1 | 7/2001 | Hopwood et al. |
| 6,297,736 B1 | 10/2001 | Lewis et al. |
| 6,301,954 B1 | 10/2001 | Schuberth et al. |
| 6,351,985 B1 | 3/2002 | Bedwell |
| 6,356,082 B1 | 3/2002 | Alkire et al. |
| 6,407,550 B1 | 6/2002 | Parakulam et al. |
| 6,549,011 B2 | 4/2003 | Flatt |
| D475,936 S | 6/2003 | Craig et al. |
| 6,633,163 B2 | 10/2003 | Fling |
| 6,643,436 B2 | 11/2003 | Flatt |

(Continued)

*Primary Examiner* — Leon Flores
(74) *Attorney, Agent, or Firm* — Nelson Mullins Riley & Scarborough LLP

(57) ABSTRACT

A system for locating an underground utility that emits an electromagnetic signal comprises first and second receivers. The first receiver has electronics that respond to a spatial position of the first receiver with respect to the electromagnetic signal and therefore the utility. The second receiver is adapted for communication with the first receiver. The first receiver is configured for disposition within an underground excavation proximate to the utility.

7 Claims, 11 Drawing Sheets

(56) References Cited

U.S. PATENT DOCUMENTS

| | | |
|---|---|---|
| 6,650,798 B2 | 11/2003 | Russell et al. |
| 6,777,923 B2 | 8/2004 | Pearson |
| 6,815,953 B1 | 11/2004 | Bigelow |
| 6,854,535 B1 | 2/2005 | Mizuno |
| 6,867,596 B1 | 3/2005 | Mizuno |
| 6,954,072 B1 | 10/2005 | Schlapp et al. |
| 6,968,296 B2 | 11/2005 | Royle |
| 6,977,508 B2 | 12/2005 | Pearson et al. |
| 7,057,383 B2 | 6/2006 | Schlapp et al. |
| 7,062,414 B2 | 6/2006 | Waite et al. |
| 7,088,105 B2 | 8/2006 | Mizuno |
| 7,091,872 B1 | 8/2006 | Bigelow et al. |
| 7,113,124 B2 | 9/2006 | Waite |
| 7,120,564 B2 | 10/2006 | Pacey |
| 7,151,376 B2 | 12/2006 | Mizuno |
| 7,235,980 B2 | 6/2007 | Pearson et al. |
| 7,304,480 B1 | 12/2007 | Pearson |
| 7,339,379 B2 | 3/2008 | Thompson et al. |
| 7,342,537 B2 | 3/2008 | Pearson et al. |
| 7,356,421 B2 | 4/2008 | Gudmundsson et al. |
| 7,612,682 B2 | 11/2009 | Staples et al. |
| 7,834,801 B2 | 11/2010 | Waite et al. |
| 7,847,556 B2 | 12/2010 | Royle |
| D631,893 S | 2/2011 | Ward et al. |
| 7,969,137 B2 | 6/2011 | Royle |
| 7,994,770 B2 | 8/2011 | Royle et al. |
| 8,058,874 B2 | 11/2011 | Royle et al. |
| 8,115,489 B2 | 2/2012 | Pearson et al. |
| 8,125,210 B2 | 2/2012 | Royle et al. |
| 8,183,851 B2 | 5/2012 | Royle et al. |
| 8,209,136 B2 | 6/2012 | Li |
| 8,515,689 B2 | 8/2013 | Li et al. |
| 8,515,690 B2 | 8/2013 | Li |
| 8,566,043 B2 | 10/2013 | Royle et al. |
| 8,676,522 B2 | 3/2014 | Pearson |
| 8,742,747 B2 | 6/2014 | Pearson |
| 8,952,677 B2 | 2/2015 | Pearson et al. |
| 9,473,203 B2 | 10/2016 | Petherick et al. |
| 9,857,494 B2 * | 1/2018 | Manning ................ G01V 3/165 |
| 2003/0052258 A1 | 3/2003 | Russell et al. |
| 2009/0128156 A1 | 5/2009 | Li et al. |
| 2010/0001712 A1 | 1/2010 | Royle et al. |
| 2010/0001713 A1 | 1/2010 | Royle |
| 2010/0001714 A1 | 1/2010 | Royle |
| 2010/0001731 A1 | 1/2010 | Royle et al. |
| 2010/0001732 A1 | 1/2010 | Royle et al. |
| 2010/0004880 A1 | 1/2010 | Royle et al. |
| 2010/0060285 A1 | 3/2010 | Pearson et al. |
| 2011/0109437 A1 | 5/2011 | Olsson |
| 2012/0139525 A1 | 6/2012 | Pearson |
| 2012/0143532 A1 | 6/2012 | Pearson |
| 2012/0232837 A1 | 9/2012 | Li |
| 2013/0113456 A1 | 5/2013 | Pearson et al. |
| 2013/0113529 A1 | 5/2013 | Pearson et al. |
| 2013/0287125 A1 | 10/2013 | Petherick et al. |
| 2014/0225617 A1 | 8/2014 | Greer |
| 2014/0225618 A1 | 8/2014 | Greer |
| 2015/0234029 A1 | 8/2015 | Polak |
| 2015/0234076 A1 | 8/2015 | Overby et al. |
| 2015/0369942 A1 | 12/2015 | Polak et al. |
| 2016/0223701 A1 | 8/2016 | Polak |
| 2016/0377760 A1 | 12/2016 | Zhang |
| 2016/0379390 A1 | 12/2016 | Benzie |
| 2017/0010381 A1 | 1/2017 | Royle et al. |
| 2017/0099168 A1 | 4/2017 | Petherick et al. |
| 2017/0102477 A1 | 4/2017 | Pearson |

* cited by examiner

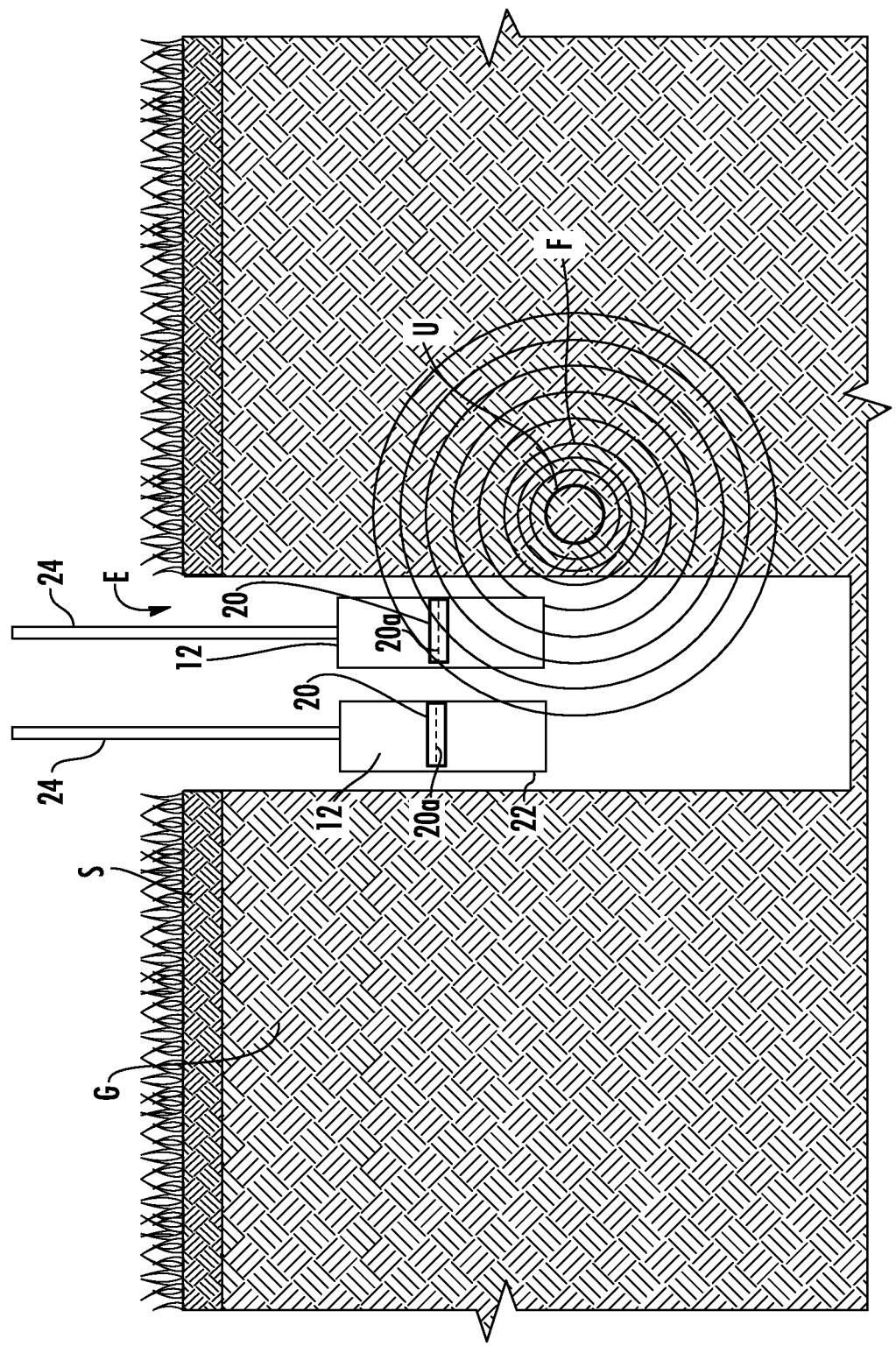

SYSTEM AND METHOD FOR LOCATING AN UNDERGROUND UTILITY

This application is a continuation of U.S. application Ser. No. 14/956,220, filed Dec. 1, 2015 (now U.S. Pat. No. 9,857,494), the entire disclosure which is incorporated by reference herein.

FIELD OF THE INVENTION

The present invention relates generally to systems and methods for locating an underground utility from an above-ground position.

BACKGROUND OF THE INVENTION

Underground utility lines may emit passive electromagnetic signals for various reasons. For example, an underground alternating current electric utility line carries its own electric signal at a given frequency that produces an electromagnetic field about the utility line. Underground cable television lines similarly carry electric signals at their own unique frequency. Other utility lines may not inherently carry an electric signal that produces an electromagnetic field but are nevertheless susceptible of having an electromagnetic field induced upon the line by the application of an electrical signal on the utility line, for example as applied by a cable locating system for the purpose of identifying the utility line's position. For example, natural gas providers typically place an electric signal on underground gas lines to provide cathodic protection against corrosion. Other utility lines such as sewer or plumbing lines are similarly susceptible to inducement of an electromagnetic field along the utility line. Any such electromagnetic field emitted by a utility line, whether generated by signals carried directly by the utility or induced on the utility by electric signals ambient to the utility, as opposed to a signal applied by a utility location system for the purpose of locating the utility, is considered a "passive" signal.

Various forms of portable equipment are known for operation above-ground to locate an underground utility via a coil antenna or, more typically, multiple antennae in differing axial orientations, tuned to detect passive signals within a predetermined frequency range. Since the underground utility line may be considered, from the perspective of a locator at a single point above the utility, to be an infinite line, the signal emitted by underground utility lines forms a generally cylindrical magnetic field coaxially about the utility. This electromagnetic field does not induce a significant signal in a coil antenna when the antenna coil axis is perpendicular to the magnetic field flux lines but will induce a peak signal in the coil antenna when the antenna coil axis is parallel or tangent to the magnetic field flux lines. The locating equipment includes an onboard processor connected to the antennas and in turn connected to a display, to indicate visually to the operator the location of the underground utility. The visual indication on the display is based on the strength and orientation of the radiated electromagnetic signals in conjunction with the operator's manipulation of the locator when receiving those signals to align the locator with the underground utility, according to the programming of the processor. An example of an above-ground cable locator is provided in U.S. Pat. No. 7,088,105, the entire disclosure of which is incorporated herein for all purposes.

Various methods may be utilized by the operator to locate the general position of, and then home in on, the underground location of the utility, e.g., carrying the locator while walking in a line believed to be perpendicular to the expected underground direction of the utility or, in cases in which the general location of the utility is not known, by walking in a grid pattern while carrying the locator, until signals are located. Depending on the locator's configuration, the operator may then manipulate the locator's position and/or orientation until signal conditions detected by the locator indicate the operator has identified an above-ground location above the utility and the utility's direction. The operator then applies a location mark or marks on the above-ground surface to indicate the detected utility line's location and direction.

Such utility location marks are not always precisely above the underground utility, for example due to factors such as the presence of a surface obstruction such as pavement, rocks or vegetation, or factors such as distortion of or inaccuracies in the radiated electromagnetic field, or human error. In instances where the operator has located such an above-ground location, but upon excavation does not uncover the utility, the operator may be unaware in which direction to continue the excavation.

SUMMARY OF THE INVENTION

In an embodiment of the present invention, a system for locating an underground utility that emits an electromagnetic field generally coaxially about the underground utility within a signal range thereabout includes a communication link and a first housing. The first housing is in communication with the communication link and has an antenna secured by the first housing and configured so that the electromagnetic field induces a signal in the antenna that varies in a predetermined manner depending on a spatial relationship between the antenna and the utility. The antenna is in communication with the communication link so that the antenna outputs to the communication link a measurement signal corresponding to the induced signal to the communication link. A second housing is separate from the first housing and is in communication with the communication link. The second housing has a display and circuitry in communication with the communication link and the display so that the second housing circuitry receives the measurement signal from the communication link and drives the display to present a human detectable presentation corresponding to a characteristic of the measurement signal that varies with the variation in the spatial relationship. A suspension is attached to the first housing and supports the first housing over a vertical distance of at least about a foot.

In another embodiment of the present invention, a method for locating an underground utility that emits an electromagnetic field generally coaxially about the underground utility within a signal range thereabout, from an excavation proximate the utility, includes providing a locating system. The locating system has a communication link and a first housing. The first housing is in communication with the communication link and has an antenna secured by the first housing and configured so that the electromagnetic field induces a signal in the antenna that varies in a predetermined manner depending on a spatial relationship between the antenna and the utility. The antenna is in communication with the communication link so that antenna outputs to the communication link a measurement signal corresponding to the induced signal. A second housing is separate from the first housing and is in communication with the communication link. The second housing has a display and circuitry in communication with the communication link and the display so that the second housing circuitry receives the measurement signal from the communication link and drives the display to present a human detectable presentation corresponding to a characteristic of the measurement signal that varies with variation in the spatial relationship. The first housing is lowered into the excavation with the first housing antenna disposed in a predetermined orientation until the display presentation indicates the first housing antenna is at a predetermined spatial relationship with the underground utility.

In a still further embodiment, a system for locating an underground utility that emits a passive electromagnetic signal generally coaxially about the underground utility within a signal range thereabout has separate first and second receivers. The first receiver has a coil adapted for detecting the electromagnetic signal of the underground utility when the receiver is disposed within the signal range. The second receiver is adapted for communication with the coil of the first receiver.

The first receiver in this embodiment is configured for disposition within an underground excavation proximate to the underground utility. The second receiver is configured and adapted for disposition above-ground remotely from the first receiver. A communication link is established between the first and second receiver for transmitting the signal values detected by the coils from the first receiver while disposed within the excavation to the second receiver while disposed above-ground.

Since the underground utility may typically extend substantially horizontally and emits the electromagnetic signal about a substantially horizontal axis, the first receiver may preferably have one coil oriented substantially horizontally and in another embodiment one coil oriented substantially horizontally and another coil oriented substantially vertically.

According to an aspect of the invention, the system may further comprises a device operable from an above-ground position for manipulating the first receiver vertically, horizontally and rotationally within the excavation for moving the first receiver into proximity to the electromagnetic signal. For example, the manipulating device may comprise an arm connected to the first receiver for suspending the first receiver from above-ground downwardly into the excavation.

The communication connection between the first and second receivers may be a hard-wired connection or may be a wireless connection.

In another embodiment of the invention, a method for locating an underground utility that emits a passive coaxial electromagnetic signal by the use of first and second receivers is carried out by excavating an underground area adjacent to the underground utility, and then positioning the first receiver within the underground excavation and positioning the second receiver above-ground remotely from the first receiver. The first receiver is manipulated within the excavation, e.g., vertically, horizontally and/or rotationally within the excavation for moving the first receiver into proximity to the electromagnetic signal, until the one coil, or one of the coils, detects a null value of the electromagnetic signal and the other of the coils, if present, detects a maximum value of the electromagnetic signal. The signal values detected by the coil(s) is/are transmitted from the first receiver to the second receiver while disposed above-ground to communicate the location of the underground utility laterally proximate to the first receiver.

The first receiver may be manipulated within the excavation from an above-ground position, for example, by an arm connected to the first receiver and suspending the first receiver from above-ground downwardly into the excavation. The signal values detected by the coils may be transmitted from the first receiver to the second receiver by a hard-wired connection or by a wireless connection between the first and second receivers.

Further features, characteristics and advantages of the present system and method will be described herein with reference to a contemplated embodiment of the invention illustrated in the accompanying drawings.

BRIEF DESCRIPTION OF THE DRAWINGS

Aspects of the present invention can be better understood with reference to the following drawings. The components in the drawings are not necessarily to scale. An enabling disclosure of the present invention, including the best mode thereof, is set forth in the specification, which makes reference to the appended drawings, in which:

FIGS. 6A and 6B depict schematically a contemplated method of use of respective embodiments of the system of FIGS. 3 and 4 to locate the underground utility in each scenario;

Figure 1:
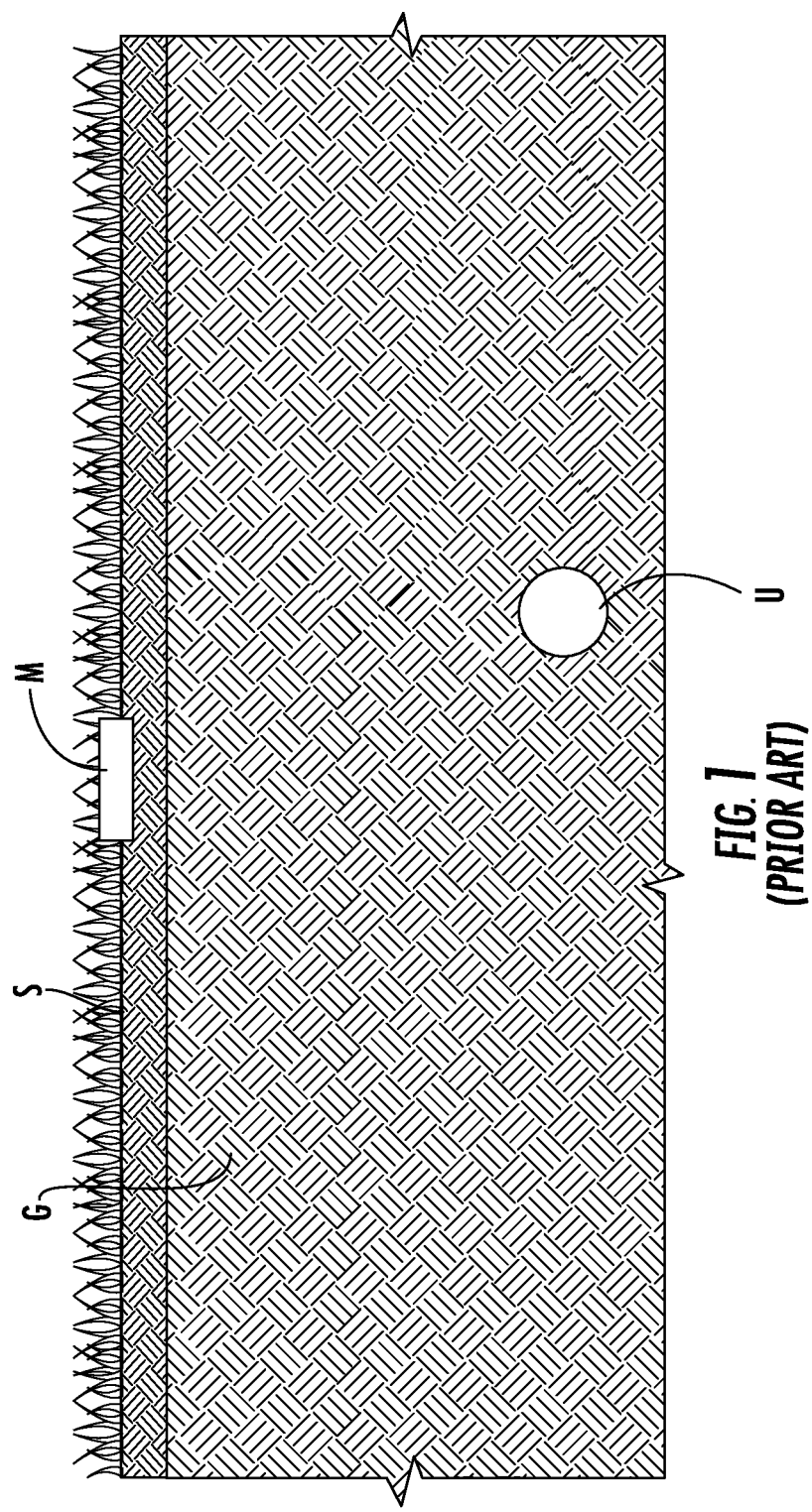
FIGS. 1 and 2 schematically depict representative examples of underground utility location scenarios that may be encountered in the prior art.

Repeat use of reference characters in the present specification and drawings is intended to represent same or analogous features or elements of embodiments of the present invention.

DETAILED DESCRIPTION OF EMBODIMENTS OF THE PRESENT INVENTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in such examples without departing from the scope or spirit thereof. For instance, features illustrated or described as part of one embodiment may be used on another embodiment to yield a still further embodiment. Thus, it is intended that the present invention covers such modifications and variations as come within the scope of the appended claims and there equivalents.

As used herein, terms referring to a direction, or a position relative to the orientation of the locator(s), such as but not limited to "vertical," "horizontal," "upper," "lower," "above," or "below," refer to directions and relative positions with respect to the above-ground and below ground receivers' 12 and 14 orientation in normal intended operation, as indicated in the Figures herein. Thus, for instance, the terms "vertical" and "upper" refer to the vertical orientation and relative upper position in the perspective of FIGS. 3 through 6B, and should be understood in that context, even with respect to a locator receiver that may be disposed in a different orientation.

Moreover, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Figure 2:
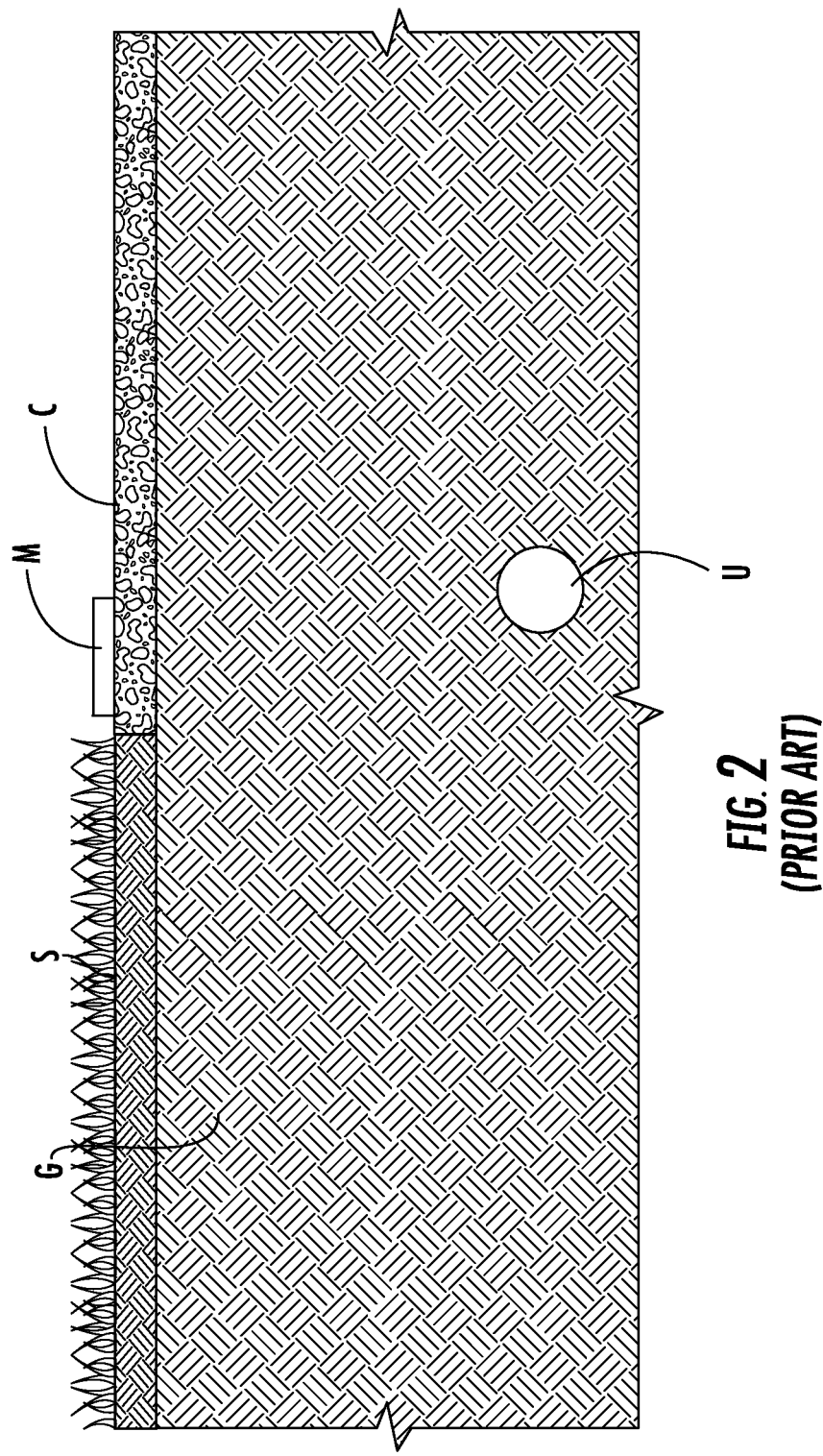

Referring now to the accompanying drawings, and initially to FIGS. 1 and 2, FIG. 1 depicts a circumstance in which a conventional above-ground portable locator unit (not shown) has been deployed to locate an underground utility, or utility line, U but for any of various possible reasons as aforementioned, a mark M made on the surface S of the ground G based upon the operation of the locator is not precisely vertically above the utility line U but is instead slightly offset horizontally therefrom. Using conventional procedures, location of the utility line U would proceed by excavating the ground G beneath the mark M until reaching an anticipated depth of the utility line U (which is measured and displayed by the portable locator unit, as should be understood, but which may also be incorrect, e.g. due to a distorted field) without successfully finding the utility line U, whereupon the workmen performing the excavation would have to decide whether to continue excavating deeper, or to extend the excavation horizontally to the left (in the perspective of FIG. 1) or to the right of a vertical line passing through the surface mark M, until the utility line U is found.

FIG. 2 depicts another possible circumstance in which deployment of a conventional above-ground locator unit has correctly identified the below-ground location of a utility line U and marked the location on the ground surface S, but the utility, or utility line, U is located beneath a surface obstacle, such as a concrete pad or driveway C. Accordingly, even though the location of the utility line U has been correctly identified, excavation to the utility line U must necessarily be carried out at the closest horizontally adjacent unobstructed ground location. Hereagain, since it cannot be known in advance that the ground marking M of the location of the utility line U is correct, conventional excavation procedures progress until the anticipated depth of the utility line U is reached, at which time the excavators must decide whether to excavate deeper or to one side.

In either scenario represented by FIG. 1 or 2, a possibility would be to lower the above-ground locator into the excavation to carry out further detection protocols, where presumably the locator will be closer to the utility line and more capable of making more precise location readings. However, if such an operation requires the insertion of the above-ground locator into an excavation, possibly carried by a human operator, the required excavation may be undesirably large. Moreover, even if a sufficiently large excavation is made to accommodate an operator and a locator, the antennae configurations of the above-ground locator may be designed, and its programming set up, for above-ground operation to detect utility lines vertically beneath the locator, not location of a line horizontally adjacent the locator. Thus, the normally vertically-elongated locator may need to be horizontally aligned in the excavation, further requiring the excavation's enlargement. To properly interpret a locator's information output when aligned vertically in such an excavation, an operator would have to know the specific antenna configuration and programming of a given locator, but since conventional locators of differing manufacturers have differing antenna configurations, this information may be beyond the knowledge, understanding, or skill of the operator.

Figure 3:
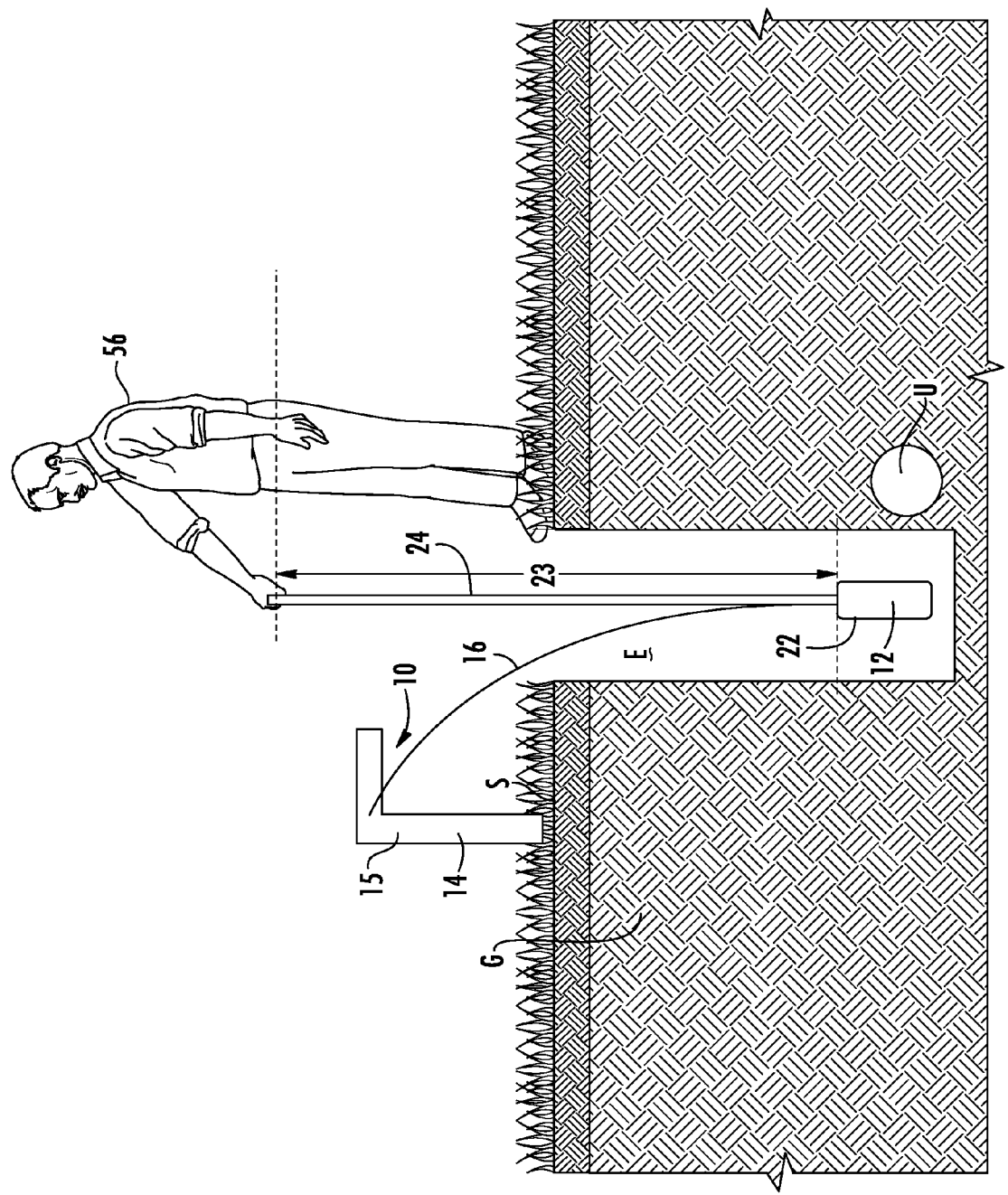
FIGS. 3 and 4 are schematic illustrations of contemplated embodiments of the present system as deployed in the scenarios of FIGS. 1 and 2, respectively.
Figure 4:
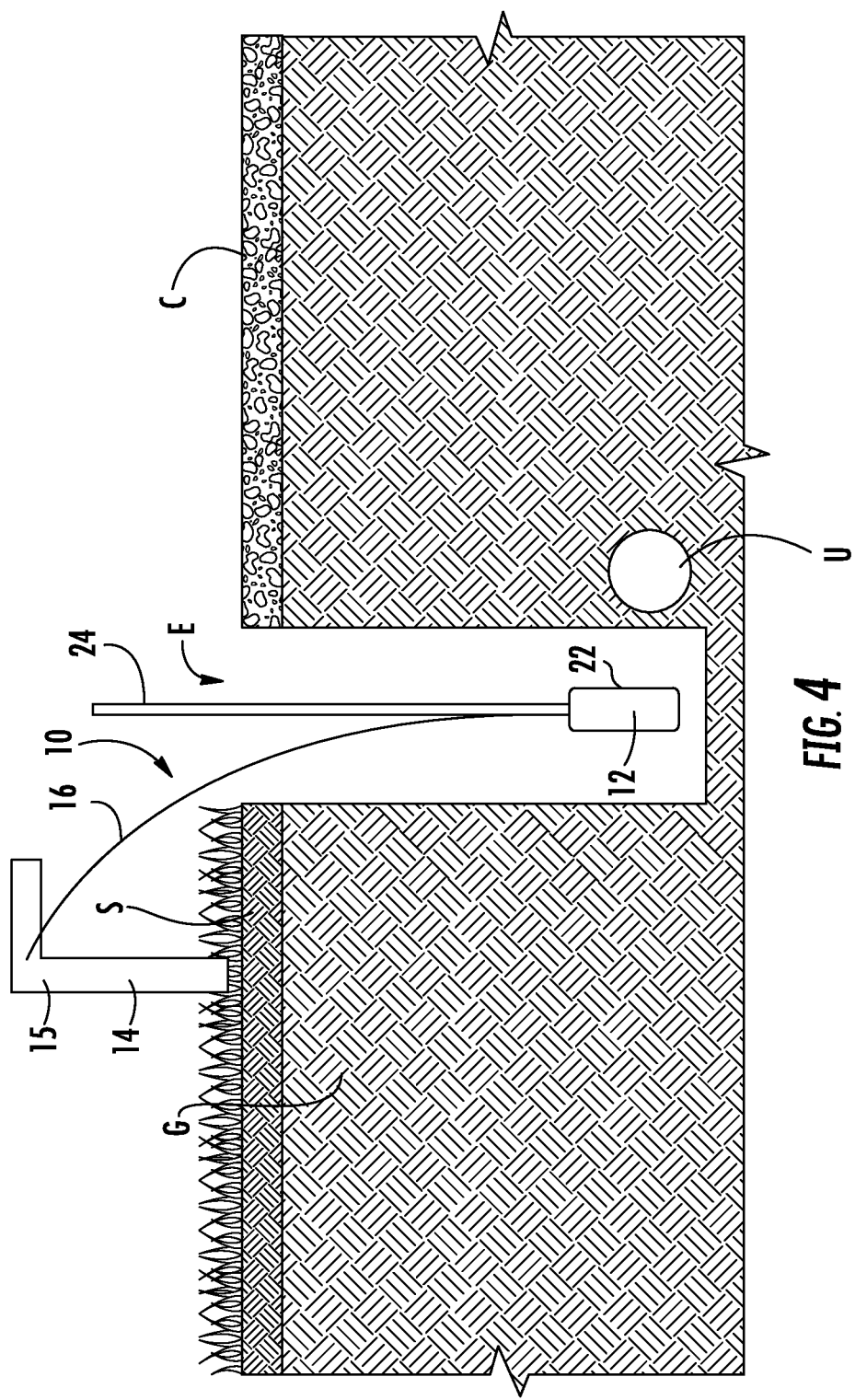

The system of the present invention overcomes these issues and problems. With reference initially to FIGS. 3 and 4, an embodiment of the present locating system is indicated generally at 10 and comprises two separate but communicative receivers 12, 14, one receiver 12 having a housing 22 and being operable in-ground within an excavation and the other receiver 14 having a housing 15 and being operable above-ground remotely from the receiver 12, with a communication link, indicated generally at 16, therebetween. The locating system 10 is depicted only schematically, as the system may employ electronics and other componentry, as described below. For example, above-ground locator 14 may be a locator such as described in U.S. Pat. No. 7,088,105, which is incorporated by reference herein (see reference 28 in the '105 patent).

Figure 7A:
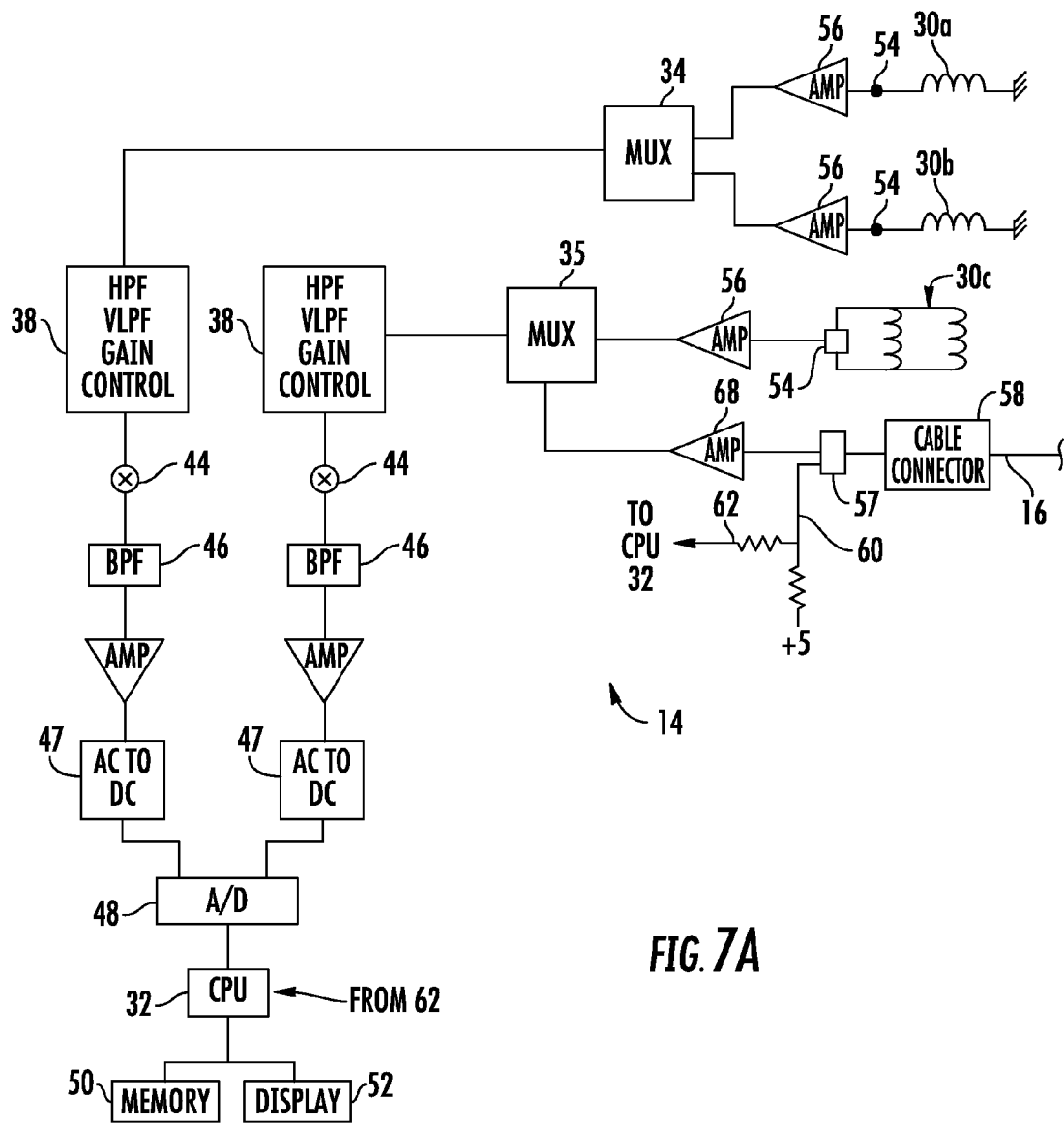
FIG. 7A is a partial diagrammatic illustration of the above-ground receiver illustrated in FIGS. 3 and 4.

FIG. 7A schematically illustrates part of the configuration of above-ground locator 14. In normal, above-ground operation, the magnetic field emitted by the underground utility induces measurement signals in antennas 30 (four of which, 30a, 30b, and a pair 30c, are illustrated in FIG. 7A). Although it should be understood that any suitable antenna may be used, each antenna 30 comprises a coil extending about a ferrite core or an air void. In the illustrated arrangement, one of antennas 30a and 30b is arranged in the housing of locator 14 in a position so that the coil axis is disposed in a horizontal alignment with the ground surface when the locator is in use as illustrated in the present Figures, while the other of the two coils is disposed in the housing so that its axis is vertical. The coil pair 30c are arranged in the housing vertically offset with respect to each other and with respect to the first horizontal coil, and with their coil axes horizontal and in parallel with each other and with the first horizontal coil axis. As indicated, the two coils 30c are arranged in a differential configuration. The particular coil arrangement of locator 14, however, can vary for a given above-ground locator, and for example can be the arrangement described in U.S. Pat. No. 7,088,105 or other suitable arrangement. Thus, it should be understood that the coil and circuitry arrangement illustrated in FIG. 7 is provided for purposes of example only.

Antennas 30 communicate with the electronics on a circuit board secured within housing 15 (FIGS. 3 and 4) of locator 14 via respective board connectors 54 and amplifiers 56. The signals from coils 30a and 30b are provided to a multiplexer 34, which is controlled by a central processing unit or other processor 32 to select between the signals of the two antennas, or to selectively disconnect both antennas from the processing circuitry. The signals from differential coils 30c are applied to a second multiplexer 35, which is also controlled by CPU 32 to select between the signals from differential coil pair 30c or the output from remote locator 12 for application to the processing circuitry, or to selectively disconnect both signal sources from the processing circuitry. The circuit board has an additional board connector 57 in communication with a cable connector 58 mounted to the housing of locator 14. Cable connector 58 may be a LEMO, coaxial, or other suitable cable connector, depending on the type of cable connection desired. As described in more detail below, when the operator wishes to utilize remote locator 12, the operator connects a cable 16, which communicatively connects locators 12 and 14 and the boards and circuitry thereof, into cable connector 58. When cable/communication link 16 is thereby selectively connected to the circuitry and circuit board secured in housing 15 of receiver 14, this connection causes an output 60 from board connector 56 to go high, causing a signal 62 to be provided to CPU 32, indicating that the remote locator is in use. Upon receiving this signal, CPU 32 switches multiplexer 35 from the output of the amplifier 56 from coils 30c to the output of amplifier 68, thereby disconnecting the measurement signal outputs of above-ground locator antennas 30c from, and applying the measurement signal output of the antenna(s) of remote locator 12 to, CPU 32 and its processing circuitry. Simultaneously, CPU 32 actuates multiplexer 34 to disconnect the outputs from both antennas 30a and 30b from the processing circuitry. Thus, the processing circuitry processes, and CPU 32 receives, the measurement signals detected by the antenna(s) of remote locator 12 rather than the antennas of above-ground locator 14.

As described below, communication link 16 may also be a wireless connection, and in such embodiment the circuit board of housing 15 of receiver 14 includes a wireless receiver circuitry component, such as a wireless receiver circuit board, that may be considered part of the circuit board secured by housing 15 and part of the circuitry thereof. When a wireless transmitter on the circuit board of the remote down-hole receiver/locator 12 circuitry wirelessly transmits measurement signals to the wireless receiver of the circuit board of above-ground receiver 14, the circuitry of receiver 14 detects the output of a signal from the wireless receiver and, in response, directs the signal output from the wireless receiver corresponding to the measurement signal from receiver 12 to CPU 32 and its processing circuitry instead of the output of antennas 30, i.e. disconnecting antennas 30 from CPU 32.

The amplified signals from multiplexers 34 and 35 output to respective 9.5 kHz high pass filters, each indicated at 38. CPU 32 controls a respective variable low pass filter that follows each high pass filter, to frequency thresholds of 12 kHz, 18 kHz, 25 kHz, and 33 kHz. In a scanning mode, used to identify signals on the utility that are inherently located on the utility, or that are "passive" signals in that they are not applied to the utility by the user, and as described in more detail in U.S. Pat. No. 7,088,105, the CPU scans signals received by the antennas in frequency steps over a 9.6 kHz-33.2 kHz range. As the CPU scans through this range, it steps the variable low pass filter through the four threshold levels to eliminate or reduce false signals caused by higher-order harmonics within the scanning filters. Each low pass filter outputs to a gain control that includes a multiplexer, a series of resistors, and an op amp/resistor pair. Each resistor defines a different resistance, and CPU 32 controls the multiplexer to select a desired input resistance to the op amp/resistor pair, thereby creating a desired amplification.

The scanning mode may be used, for example, prior to using the above-ground portable receiver 14 to locate the utility, where the frequency of the passive signal on the utility is unknown. Assume, for example, that receiver 14 is used to locate a utility that the user knows carries a detectable signal but that the user does not know the signal's frequency. The user may first place receiver 14 near an above-ground exposure of the utility, or above a known underground location of the utility, or near an above-ground junction box or post to which the utility is connected, and execute either of the manual or automatic frequency searches (causing CPU 32 to execute scanning mode and scan the receiver through the 9.6 kHz-33.2 kHz range) discussed herein and in U.S. Pat. No. 7,088,105 to locate the peak frequency at which the utility emits passive RF signals. After activating an interface button to set the locator to the peak frequency, the operator proceeds to locate the utility in the field in cross-wise or grid patterns or other pattern as desired.

The now-amplified signals are output from each automatic gain control to a respective mixer 44 and bandpass filter 46. Together, mixer 44 and bandpass filter 46 comprise a selectable bandpass filter. Each mixer 44 mixes a clock signal from CPU 32 with the measurement signal from the gain control so that the signal output from the mixer has a frequency equal to the difference between the clock signal frequency and the measurement signal frequency. Each bandpass filter 46 includes a pair of filter stages that pass a frequency range of approximately 1.1 kHz to 1.5 kHz. The CPU controls mixer 44 to cycle the overall variable bandpass filter formed by mixer 44 and filter 46 through frequency bands within a predetermined measurement frequency range in order to find a passive signal emitted from an underground utility of interest, despite the presence of competing background signals. Each bandpass filter 46 outputs its signal to a detection circuit 47 that AC-couples the signal prior to input to an analog-to-digital converter 48, which passes a digitized signal to CPU 32. The CPU communicates with a memory 50, which may be wholly or partly maintained within the CPU, to store and retrieve signal values. A display 52 assists the user in finding the desired signal.

The CPU steps the clock frequency through predetermined levels (from 10.8 kHz to 34.4 kHz) so that the overall variable bandpass filter formed by mixer 44 and the variable low pass filter consecutively steps through the measurement frequency range (9.6 kHz 33.2 kHz in the present example) at 0.4 kHz increments. For example, assume the operator stands above the known above-ground or underground position of the utility that emits a passive signal at 9.6 kHz, disposes antennas 30 so that the antennas are perpendicular to the utility line, and activates the CPU to measure the strength of the signals received by the antennas. The CPU initially sets the frequency threshold of the variable low pass filter to 12 kHz. Due to the high pass filter and variable low pass filter 38, therefore, the mixer receives a measurement signal ranging in frequency from 9.5 kHz to 12 kHz. Since the utility is emitting a passive signal at 9.6 kHz, the measurement signal contains the peak signal.

The CPU also initially sets the clock signal to 10.8 kHz. As noted above, the signal output by the mixer has a frequency equal to the difference between the clock signal frequency and the measurement signal frequency. Thus, when mixer 44 mixes the measurement signal with the clock signal, the signal output from the mixer has a frequency range of −1.2 kHz (i.e. a 1.2 kHz signal with opposite phase) to 1.3 kHz. Since the peak signal is at 9.6 kHz, the peak in the mixed signal is located approximately at 1.2 kHz, which is within the 1.1 1.5 kHz pass band of bandpass filter 46. That is, the 1.1 1.5 kHz pass band of filter 46 corresponds to a pass band of 9.3 9.7 kHz (limited by 9.5 kHz filter 88) in terms of the measurement signal frequencies, and this includes the peak signal at 9.6 kHz. Being the first measurement, the CPU stores and displays the signal strength and the approximate center frequency of the pass band in which the signal was detected, i.e. the clock frequency step (10.8 kHz) minus 1.2 kHz, or 9.6 kHz.

CPU 32 maintains this frequency band for about 0.5 seconds and then increases the clock frequency by 0.4 kHz, to 11.2 kHz. The variable low pass filter remains at 12 kHz. The mixer again receives a measurement signal having a range of 9.5 kHz to 12 kHz. Again, this signal includes the strong portion at 9.6 kHz. The mixer, however, changes the measurement signal's frequency to a range from –0.8 to 1.7 kHz. The signal peak is at 1.6 kHz (i.e. 11.2 kHz-9.6 kHz) and is, therefore, slightly beyond the filter's peak pass band of 1.1 1.5 kHz. In other words, the overall filter's peak pass band now ranges from 9.7 kHz to 10.1 kHz, which excludes the signal peak. The CPU compares the new signal strength with the previously stored signal strength. Since the new measurement is weaker, the CPU does not store the new signal strength or its measurement frequency.

The CPU increases the clock frequency by 0.4 kHz, to 11.6 kHz. At this step, the bandpass filter passes the measurement signal corresponding to the frequency range 10.1 10.5 kHz. Thus, the peak signal is again outside the pass band. The signal strength measured by the CPU is less than the stored value, and the CPU therefore maintains the previously stored signal strength and measurement signal frequency values in memory 50.

The CPU then consecutively increases the clock frequency, intermittently increasing the threshold level of the variable low pass filter to accommodate the increase in frequency range, and measures the signal strength at each step. Since each step moves the filter pass band farther from the 9.6 kHz peak value, the CPU maintains the signal values stored at the 10.8 kHz clock frequency step. Upon completely scanning the measurement frequency range, the CPU causes display 52 to display the approximate center frequency (9.6 kHz) of the measurement signal frequency range (9.3 kHz to 9.7 kHz) at which the peak signal was found. The operation of the processing circuitry is described in U.S. Pat. No. 7,088,105, incorporated by reference herein, and is therefore not discussed in further detail.

The operator may start the automatic scan by activating either of up or down buttons provided on the receiver's (14) user interface at display 52. If the operator presses the up button, CPU 32 starts at the bottom of the operative frequency range (9.6 kHz in the present example) and samples upward in 0.4 kHz steps to the top of the range (33.2 kHz in the present example). If the down arrow is pressed, the CPU starts at the top of the frequency range and moves down. When searching down through the operative range, the measurement frequency is considered to be 1.2 kHz above the clock frequency, and the CPU displays the measurement frequency (clock frequency plus 1.2 kHz). As the CPU scans the frequency range in the automatic scan mode, a frequency indicator at the user interface blinks, and continues to blink during the scan. A bar graph and numerical indicator show the signal intensity currently stored as the strongest signal received by the system, and the frequency indicator blinks at the frequency corresponding to the present frequency being scanned. Thus, these indications change as the system finds stronger signals. Because smaller peak levels may indicate the presence of other underground cables in the area, the operator may note the frequencies at which such smaller peaks occur for later attempts to locate the other cables.

When the system finds the peak level, CPU 32 has stored the frequency level in memory 50. The frequency indicator stops blinking, thereby notifying the operator that the automatic scan is complete. The bar graph and numerical indicator at display 52 show the signal intensity at the frequency selected by the scan at which the strongest signal is received, and the operator proceeds on with utility measurements in the field, with the circuitry of FIG. 7A of receiver 14 set at that frequency, to locate the underground utility as discussed above. As noted above, the user actuates a button presented by the user interface of receiver 14 to cause CPU 32 to configure the circuitry illustrated in FIG. 7A to filter and search for signals at and about the found and selected peak. This, then, becomes the frequency range for which receiver 14 searches as the user walks the field in search of the underground utility's location in the field and the frequency range at which down-hole receiver 12 detects signals from utilities near an excavation.

In a further embodiment, the receiver 14 and its CPU are configured to scan only in the frequency-increasing direction, so that the user interface provides only an "up" button, and the CPU starts at the bottom of the frequency range and scans upward, as described above, but does not provide a downward scan option. Where scanning is provided, either (or other) approach may be implemented. Also, in either scan mode, an option may be provided through the user interface (e.g. by a user actuatable button at the screen display) to stop the scan mid-scan and restart the scan from the frequency point at which the scan was stopped.

Furthermore, as noted above, the locator/receiver 14 (and locator/receiver 12) may also be used to locate underground utilities emitting signals at active frequencies and at frequencies other than within the above-described radio frequency band. For example, the receivers may also be used to locate passive signals at 50-60 Hz for power lines or 110-120 Hz for gas lines, or to locate active signals at 512 Hz for fault location. The receivers/locators may also be used to locate utilities emitting signals resulting from signals actively placed on the utility by the operator through direct connection to the utility or through a probe passed through the utility, as described in U.S. Pat. Nos. 6,102,136 and 7,088,105, each of which is incorporated by reference herein. In one presently preferred embodiment, the active signals are generated at frequencies of 512 Hz, 9.5 kHz and 38 kHz. Accordingly, the filter configuration indicated at 38 in FIG. 7A includes three additional band pass filter circuits, each defining a pass band encompassing a respective one of the frequency levels of 50-60 Hz, 110-120 Hz, and 512 Hz. The filter circuits are disposed in parallel with each other. When the operator selects a desired frequency level via the user interface, CPU 32 automatically selects the corresponding one of the parallel filter circuits through a multiplexer controlled by CPU 32. When the operator selects the 9.5 kHz and 38 kHz frequencies, the multiplexer selects the path of filter 38, being set to an appropriate configuration for the selected frequency.

Similarly, the locator includes four additional bandpass filter circuits (not shown) in parallel with bandpass filter 46 to accommodate location of signals at the 50-60 Hz, 100-120 Hz, 512 Hz and 9.5 kHz/38 kHz ranges. Although a separate band pass filter is provided for the 9.5 kHz and 38 kHz signals, it should be understood that band pass filter 46 may instead be used for these frequencies. When the operator selects a desired frequency level, the CPU automatically selects the corresponding one of the four parallel bandpass filter circuits through a multiplexer controlled by the CPU.

A button on the user interface of receiver 14 at, e.g. a touchscreen, display 52 allows the user to specifically set the receiver for reception of signals at any of the five predetermined frequency levels. As noted, three of these frequency levels (512 Hz, 9.5 kHz and 38 kHz) are used with signals directly or indirectly placed on the underground utility by an above-ground transmitter. In these direct modes, user connects the utility to a transmitter that places a location signal on the utility through a cable that attaches to the utility or to a conduit encasing the utility. In the presently described embodiment, the signal is either a combination of 9.5 kHz and 38 kHz or a combination of 512 Hz and 9.5 kHz. Generally, 9.5 kHz is preferred for locating cables in areas congested with existing utilities and for power cables and tracer wires, while 38 kHz signal is preferred for CATV lines and metal pipes and cables. Thus, in such conditions, the transmitter applies the 9.5/38 kHz signal in direct connection or external connection mode, and the operator sets the locator to receive at 9.5 kHz or 38 kHz, as appropriate. The 9.5 kHz/512 Hz signal may be used for cable location but may also be used to detect faults. In an induction mode, the transmitter is placed on the ground above the utility and emits an electromagnetic field that induces a signal on the utility at 38 kHz. Additionally, and also as noted above, the locator may be set to locate signals at 50-60 Hz (power frequencies) and 110-120 Hz (gas line signals) that are already on the utility, in which case a transmitter is not used. The user may also place a probe in the utility and that moves through the utility while emitting a signal at a predetermined frequency, e.g. 38 kHz, and the filter configuration may be configured to detect a frequency range including this expected peak frequency, in a manner as described above. Where, for instance, the probe emits a 38 kHz signal, a 38 kHz configuration may be used as discussed herein.

Each of these five frequency positions (9.5 kHz, 38 kHz, 50-60 Hz, 110-120 Hz, and 512 Hz) is stored by the system CPU and memory, and the user interface allows the operator to cycle through the frequency options to select a desired range. Generally, the operator sets the receiver to one of these frequency settings in order to locate and determine the depth of a utility line that is emitting signals at the known frequency, or uses the automatic frequency scanning mode to find the utility's emitting frequency in the RF range. Moreover, it should be understood that the circuitry configuration illustrated in FIG. 7A and discussed herein is an example of a possible receiver configuration but that other configurations and modes of operation are possible and encompassed by the present disclosure. In any event, once the operator sets the receiver to detect signals at a given frequency range, the user searches for and locates the utility as described above.

Furthermore, while it will be understood from the discussion above that in embodiments of methods of use of the locators/receivers 14 and 12 discussed herein, the operator will often set receiver/locator 14 to automatic scan mode with the locator near a known location of the utility to thereby set the locator's signal processing circuitry to the identified frequency for locating the utility in the field, locators/receivers 14/12 may also be used in scan mode when receiver 12 is in an excavation. For example, assume that the operator has set the frequency range in the circuitry of receiver/locator 14, e.g. by setting the frequency manually or through the scan mode as discussed above, and that the operator identifies the location of an underground utility from an excavation utilizing locator/receiver 12 as discussed herein, and that in that process the operator unexpectedly discovers the presence of other underground utilities from the excavation. Once identifying the position of the originally-sought-after utility with respect to receiver 12 as discussed herein, the operator may then disconnect any active signal placed onto the originally-sought-after utility and actuate the frequency scanning mode via the user interface of locator/receiver 14 at display 52. Since the output of the antenna of in-ground receiver 12 is connected to the signal processing circuitry of receiver 14, receiver 14 scans for the peak signal frequency detected by the receiver 12 antenna. Thus, by placing receiver 12 proximate the newly discovered utility and actuating the frequency scan mode as discussed above, so that receiver 14 identifies and displays the peak detected frequency at display 52 as discussed above, the operator can identify the frequency of a signal carried by the unknown utility, if a signal is present. Since signals carried by utilities can vary in frequency predictably according to the type of utility, the identification of a signal frequency on an unknown utility according to this method can assist the operator in identifying the type of the unknown utility. Where the originally-sought-after utility was detected by a passive signal, downhole receiver 12 may still be used to locate other utilities in a scan mode where the other utilities provide stronger signals at the receiver's (12) location and/or where the scan mode provides an option via the user interface for the user to define a frequency range that will be omitted from the scan. For example, suppose the original utility was located by identifying a passive signal on the utility at 15 kHz. To scan for other utilities, the user enters a frequency range of 14.5 kHz-15.5 kHz and actuates an "omit" button in the user interface.

The receiver's (14) CPU then conducts the scan as described above, but omitting the 14.5 kHz-15.5 kHz range, thereby avoiding the possibly-stronger signals from the original utility.

Figure 7B:
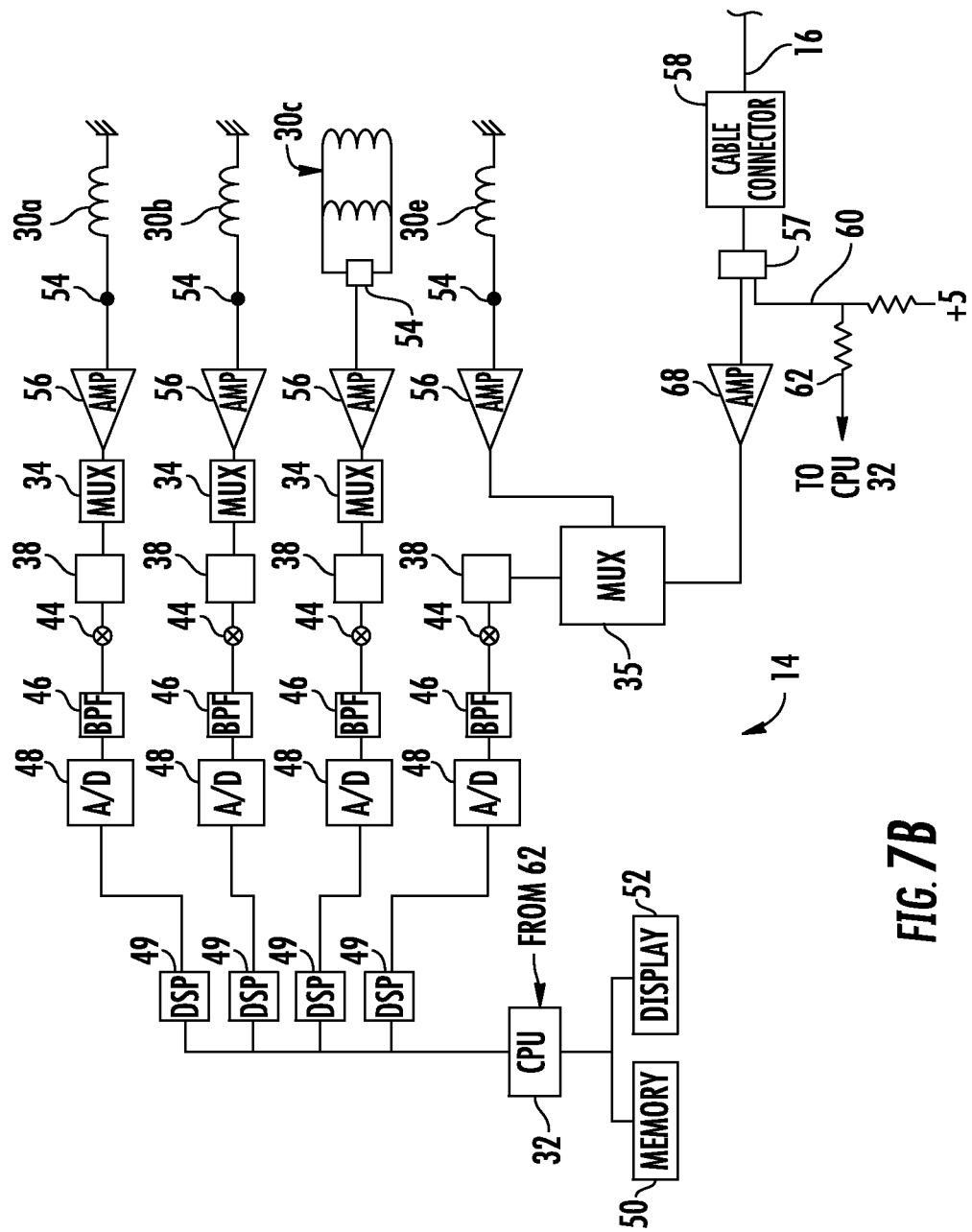
FIG. 7B is a partial diagrammatic illustration of another embodiment of the above-ground receiver illustrated in FIGS. 3 and 4.

A further embodiment of locator 14, illustrated in FIG. 7B, has five coils, with coils 30a, 30b, and 30c arranged as discussed above with respect to FIG. 7A, and with an additional coil 30e disposed in the housing of locator 14 so that its axis is horizontal to the ground surface but perpendicular to the axes of the first horizontal coil axis and of coils 30c. As in the embodiment of FIG. 7A, antennas 30 communicate with the electronics on the circuit board secured within the housing of locator 14 via respective board connectors 54 and amplifiers 56. The signals from coils 30a, 30b, and 30c are provided to respective arrangements of high pass filters, variable low pass filters, and automatic gain control circuits, as indicated at 38, that operate as described above with respect to FIG. 7A. The signals from coil 30e are applied to a multiplexer 35, which is controlled by CPU 32 to select between the signals from coil 30e or the output from remote locator 12 for application to the processing circuitry, or to selectively disconnect both signal sources from the processing circuitry. Additional board connector 57 is in communication with cable connector 58. When the operator wishes to utilize remote locator 12, the operator connects a cable 16, which connects locators 12 and 14 and the boards and circuitry thereof, into cable connector 58. When communication link 16 is thereby selectively connected to the circuitry and circuit board secured in housing 15 of receiver 14, this connection causes output 60 to go high, causing signal 62 to be provided to CPU 32, indicating that the remote locator is in use. Upon receiving this signal, CPU 32 switches multiplexer 35 from the output of the amplifier 56 from coil 30e to the output of amplifier 68, thereby disconnecting the measurement signal outputs of above-ground locator antenna 30e from, and applying the measurement signal output of the antenna(s) of remote locator 12 to, CPU 32 and its processing circuitry. Simultaneously, CPU 32 actuates multiplexers 34 to disconnect the outputs from all four antennas 30a, 30b, and 30c from the processing circuitry. Thus, the processing circuitry processes, and CPU 32 receives, the measurement signals detected by the antenna(s) of remote locator 12 rather than the antennas of above-ground locator 14. As described above, communication link 16 may also be a wireless connection.

Digital signal processor 49 receives the antenna coil measurement signals from the respective filter and gain control stages 38 via respective analog-to-digital converters 48 and digital signal processors (DSPs) 49 (which may be comprised by a single DSP device). The digital signal processors acquire and process the respective signals from the filter stage and provide the respective output signals to CPU 32, which interacts with memory 50 and display 52 and otherwise functions generally as described above with respect to the embodiment of FIG. 7A.

Figure 8A:
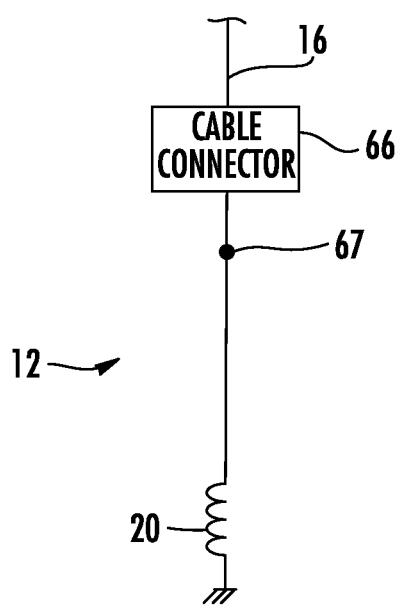
FIGS. 8A and 8B are partial diagrammatic illustrations of the below ground receivers illustrated in FIGS. 3, 4, 5A, 5B, 6A, and 6B.
Figure 8B:
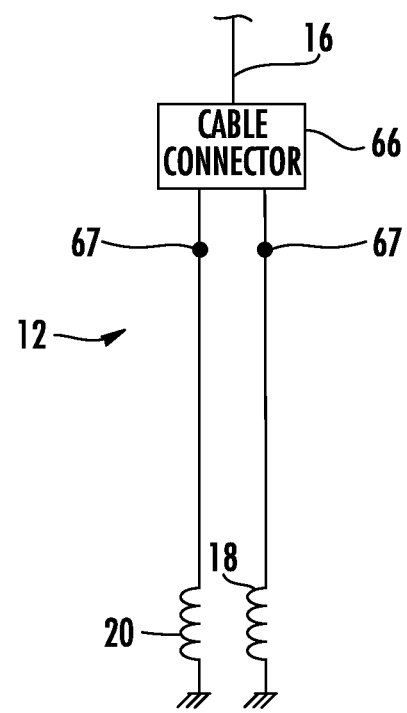

FIGS. 8A and 8B schematically illustrate configurations of two embodiments of remote locator 12 and the circuitry thereof secured by housing 22, one having a single coil antenna, and the other having two coil antennas, as indicated in the figures. Referring to FIG. 8A, cable 16 is removably or permanently connected to a cable connector 66 secured to the housing of locator 12 and communicating with a circuit board in the locator housing via a board connector 67, so that cable 16 receives the output of measurement signals induced on single antenna 20 by magnetic fields emitted by the underground utility. The configuration of the remote locator in FIG. 8B is similar to that of FIG. 8A, except that the outputs of the two coils 20 and 18 lead to cable connector 66, from which cable 16 separately conveys the leads from the antennas to the circuitry of above-ground receiver 14 in FIG. 7A or 7B. Where two antennas are used, as in FIG. 8B, the two discrete leads are connected to respective circuit blocks 57/58/60/62/88 as illustrated in FIGS. 7A and 7B, where the two such circuit blocks output to multiplexer 35. The programming at CPU 32 in such presently-described embodiments drives the user interface at display 52 to provide the user an option to select signals from one of the two antennas or the other. Upon receiving the user's selection, the CPU responds to signals output at 62 only for the selected antenna. Alternatively, the circuitry of FIGS. 7A and 7B may be configured to provide separate paths from the respective outputs of the two antennas of receiver 12 to CPU 32, in a manner similar to the separate paths provided to the CPU from the multiple antennas of the above-ground receiver 14, so that the CPU can automatically select between the antenna signals.

Figure 5A:
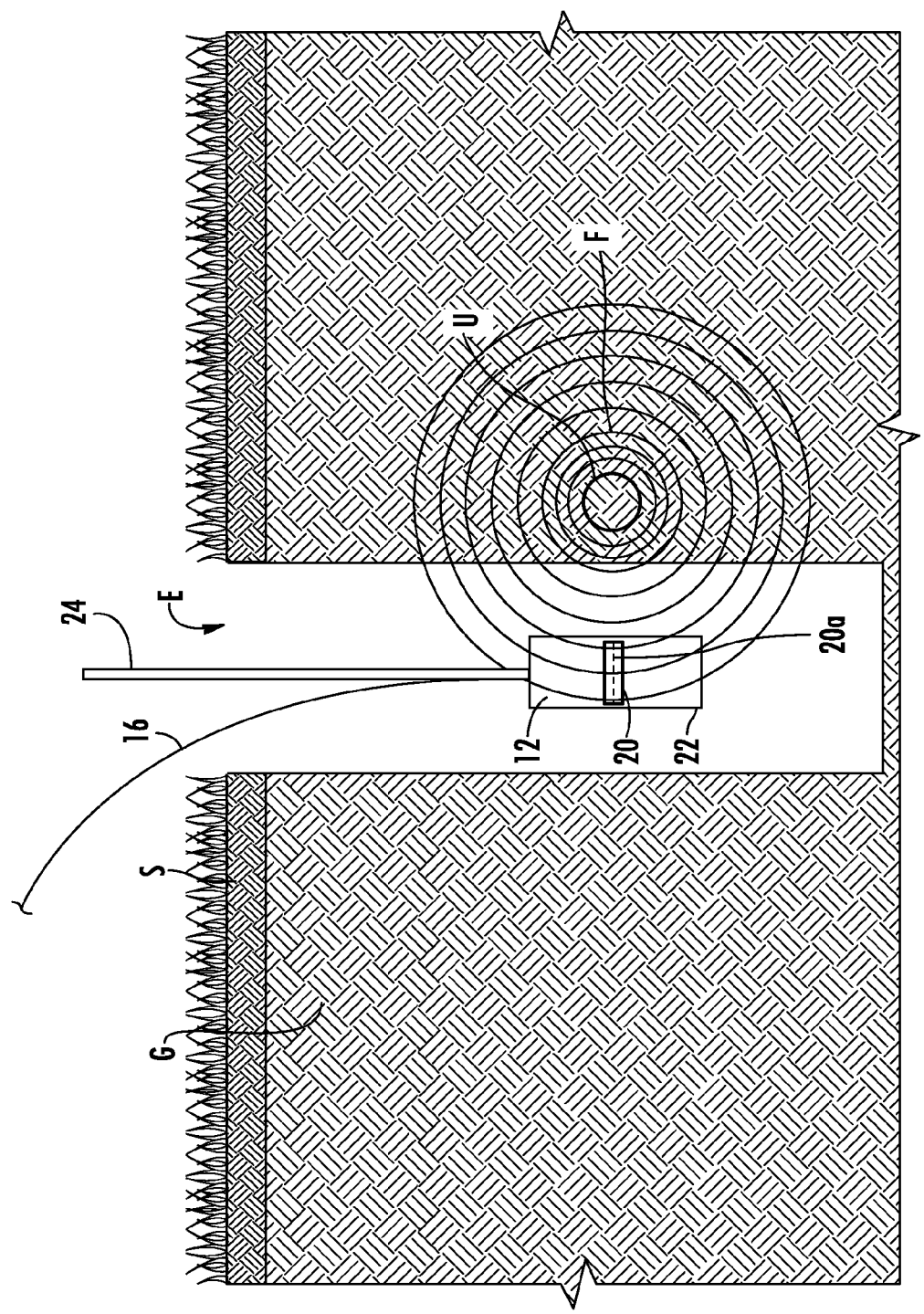
FIGS. 5A and 5B depict schematically a contemplated method of use of respective embodiments of the system of FIGS. 3 and 4 to locate the underground utility in each scenario.
Figure 5B:
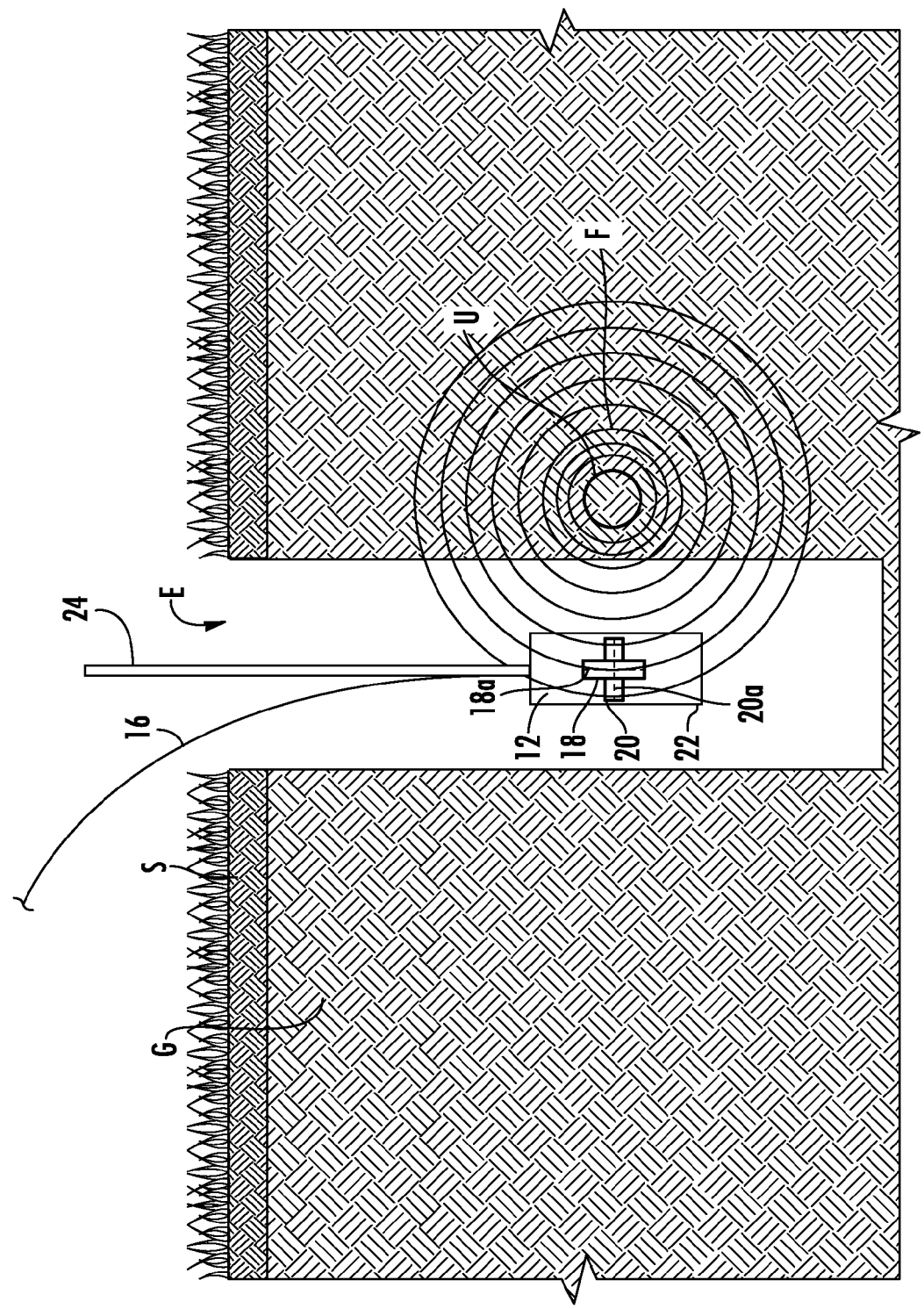
Figure 6B:
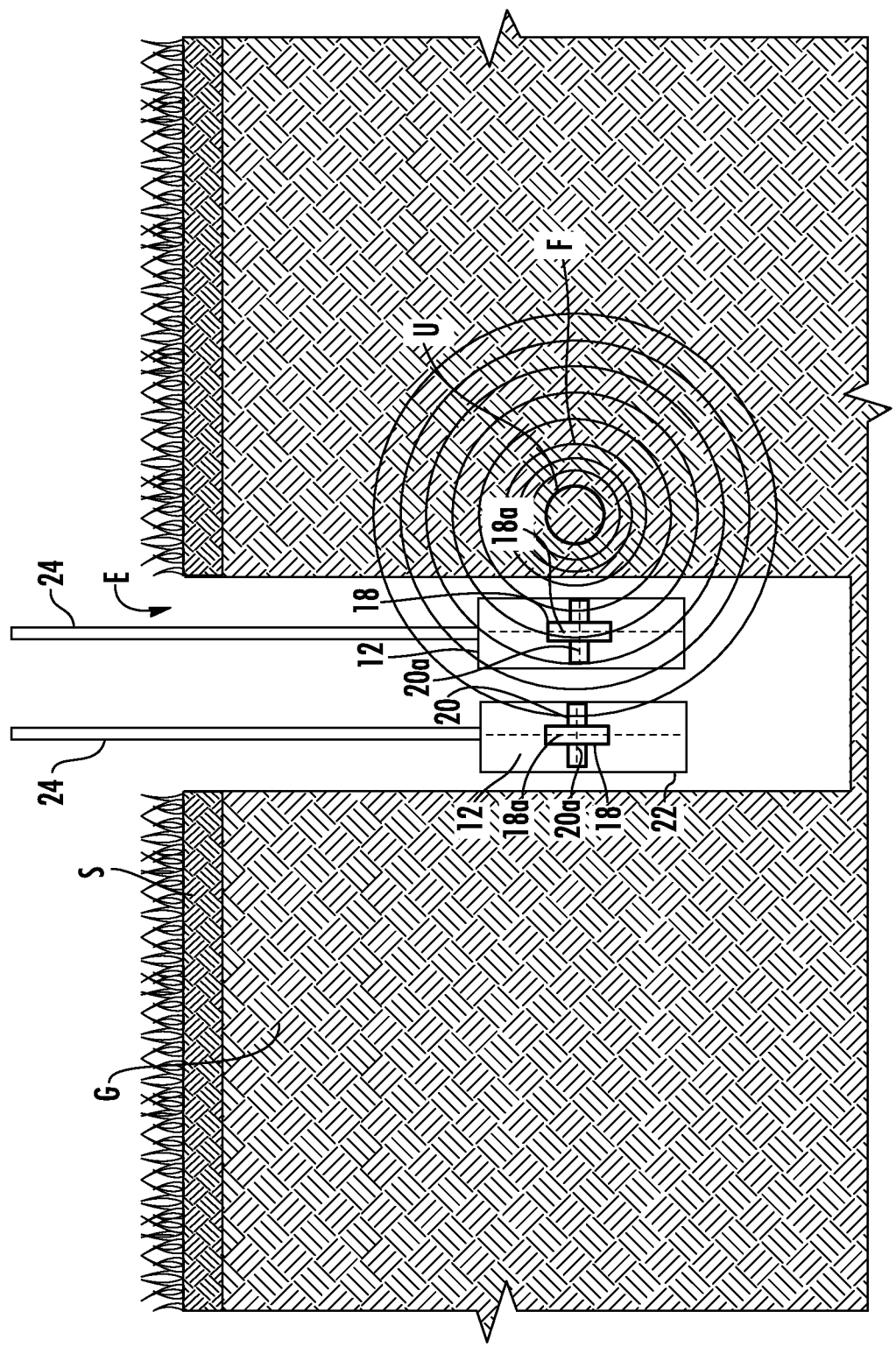

As depicted in FIGS. 5A and 5B, and in FIGS. 6A and 6B, the in-ground receiver 12 comprises a single antenna coil, indicated representatively at 20, or a pair of orthogonal coils indicated at 18 or 20, contained within a compact housing 22 suitably configured to be manually lowered into and manipulated within an underground excavation, such as represented at E, which may advantageously be of a restricted dimension, e.g., a narrow trench, a downhole bore, or other form of excavation smaller than would effectively accommodate a conventional above-ground locator and/or a human operator, by use of suspension as discussed herein. Each antenna coil 18, 20 may be of any suitable type, e.g. a coil antenna about a ferrite or air core and defining a linear coil axis 18a, 20a so as to be adapted for inducement of an electrical current within the antenna when disposed so that the magnetic flux lines of the electromagnetic field emitted by the utility are not orthogonal to the coil axis, whereby the coil may be utilized to detect a proximate electromagnetic field, e.g., a passive electromagnetic signal field F as may be emitted by an underground utility line U (as a result of passive signals inherently on the utility or active signals induced on the utility) to radiate coaxially thereabout. As will be understood by those of ordinary skill in the art in view of the present disclosure, electromagnetic signal field F induces a measurement signal on coil 20, and/or coil 18 that varies with variations in a spatial relationship, e.g. linear distance, between the antenna and the utility.

As noted, in-ground receiver 12 is constructed to a size that can be descended into the excavation and then moved and manipulated therein. Generally, in certain embodiments, housing 22 is made sufficiently small to be received by and moved and manipulated in the excavation, while providing sufficient space to house the one or more antennas, depending on the given design, within the housing. In a single antenna embodiment, for example, house 12 fits within a 3"×2"×1" (where '"' represents inches) boundary, while a two antenna embodiment fits within a 4"×2"×1" boundary, but it will be understood that the housing dimensions may vary and may be, for example, smaller or larger than these examples.

Referring to FIGS. 5A and 6A, antenna coil 20 is oriented within receiver 12 and secured within housing 22 so that its axis is oriented horizontally with respect to a vertical dimension of the housing (i.e. the dimension of housing 22 intended to maintain vertically when disposed within an excavation E). In this manner, and as illustrated in FIG. 5A, the measurement signal on coil 20 is at a null when the locator 12 is lowered by the operator via handle 24 sufficiently far into excavation E that coil 20 is horizontally even with utility U, i.e. that the coil's axis 20a passes through the center of utility U. At this point, the magnetic flux lines of the signal emitted by utility U are orthogonal to the coil's axis 20a, causing the coil's measurement signal to be a null.

Referring to the embodiments as shown in FIGS. 5B and 6B, antenna coils 18, 20 are oriented within remote locator 12 with their respective axes 18a, 20a substantially perpendicular to one another, preferably with one coil, e.g., coil 18, oriented vertically with respect to a vertical dimension of the housing 22 (i.e., the dimension of the housing 22 intended to be maintained vertically when disposed within an excavation E) and the other coil, e.g., coil 20, oriented horizontally with respect to such vertical dimension. In this manner, the coils 18, 20 can determine the lateral proximity of an electromagnetic signal when one of coils 18, 20 registers a null value while the other coil detects a maximum value of the electromagnetic signal, such as the orientation of the coils 18, 20 as depicted in FIG. 5B. As indicated above, the measurement signal induced at coil 20 at this position is a null. Since the magnetic flux lines are parallel or tangential with the coil axis 18a of coil 18, however, the measurement signal of coil 18 is at a maximum.

Referring again to FIGS. 7A and 7B, above-ground receiver 14 generates a representation of the signals provided by coils 20 and, possibly 18, usable to an operator also located above-ground, e.g., via an analog or digital visual or audible representation of the signal values at display 52. For example, display 52 may display visible graphics that increase and decrease directly with increases and decrease in antenna measurement signals or audible display sounds that similarly increase and decrease in volume directly with increase and decrease in the antenna signal intensity. It is contemplated that the above-ground receiver 14 may be a manually portable above-ground locator unit, such as schematically represented in FIGS. 3 and 4 and described at U.S. Pat. No. 7,088,105, retrofitted or enhanced with electronics or other means to receive the signal values from the coils 20 and optionally 18, for example as described above with respect to FIGS. 7A and 7B. For example, it is contemplated as described herein that above-ground receiver 14 is configured and programmed to be ordinarily functional in one mode of operation as an above-ground locator and, alternatively, to be switchable to operate in a second mode of operation to receive and display signal values from the coils 20 and optionally 18 of the receiver 12. For example, it is contemplated as described herein that above-ground receiver 14 is arranged to automatically disable normal above-ground operation and switch to the second mode of operation in accordance with the present invention when connected to the communication link, in this example cable, 16. However, it is equally contemplated in accordance with the present invention that above-ground receiver 14 may be configured as a single purpose unit intended and capable solely of receiving and displaying or otherwise communicating signal values from the coil 20 and optionally 18 of the receiver 12.

An appropriate suspension is provided for lowering receiver 12 into and manipulating receiver 12 within excavation E. It is contemplated that various possible suspensions may be utilized for this purpose, and in certain embodiments described herein, the suspension suspends the receiver housing 22 a vertical distance of at least about a foot vertically between the housing and a point at which the above-ground operator grips a portion of the suspension opposite housing 22, or a point at an end of the suspension opposite housing 22, or a point on the suspension opposite housing 22 at which a support structure otherwise secured to the ground secures and supports the suspension, thereby supporting the weight of housing 22. For example, but without limitation, one possible arrangement as depicted in FIGS. 3 and 4 is to provide an arm such as a rigid or telescoping rod, represented only schematically at 24, physically connected to the receiver 12 and extend housing 22 by which the aboveground operator may suspend the receiver 12 downwardly into the excavation E to a desired elevation and to move the receiver 12 vertically upwardly or downwardly, horizontally forwardly or rearwardly, and/or rotationally within the excavation E. As may be desirable, the arm 24 may include one or more joints to facilitate articulation of an articulated arm 24 and/or the rod may be extensible and retractable to facilitate length adjustments. However, as persons skilled in the art will recognize and understand, any number of other devices or means may be utilized to provide similar capabilities for manipulation of the receiver 12. In one embodiment, for example, housing 22 includes a threaded connector secured to and disposed at a top side of housing 22 and configured to threadedly secure to an elongated pole or rod 24 of sufficient length that an operator standing on ground surface S adjacent excavation E holding a portion of pole 24 extending vertically aboveground surface S can lower housing 12 into excavation E to an expected depth of utility U, as shown in FIG. 3. The threaded connection between housing 22 and pole 24 is such that when secured, and when the operator holds pole 24 vertically in the excavation, housing 22 is oriented so that axis 20a of coil 20 is horizontal and axis 18a of coil 18, if present, is vertical. In other embodiments, suspension 24 may comprise a flexible cable similarly attached to a top of housing 22 and similarly held by an above-ground operator as shown in FIG. 3 to define a vertical length 23, or the rigid or articulated rod or flexible cable may be secured at or near a top end thereof to a truss structure secured to the ground and optionally having a hand or motorized crank to selectively lower housing 22 down into excavation E. Thereby, in any such embodiments, the suspension supports the weight of housing 22 a vertical distance, e.g. distance 23, of at least about a foot, and/or to greater distances, depending on the suspension's configuration and use. An at least one foot, e.g. about a 2.5 foot to about three foot, suspension, for example, may be useful where a user lies prone on the ground and thereby lowers housing 22 into an excavation by reaching down into the excavation with the receiver, whereas an about five foot to about seven foot rod may be useful for a user standing at ground level (e.g. as shown in FIG. 3), and whereas an about sixteen foot cable may be useful where the suspension is a cable suspended from a truss structure. Accordingly, it will be understood that the manner and length of the suspension may vary.

Similarly, various possible means may be employed as communication link 16 within the scope of the system of the present invention. As representatively depicted in FIGS. 3 and 4, the communication connection 16 may be a physical connection between the receivers 12, 14, such as an electrical cable or the like, but it is also equally contemplated that the communication connection 16 may be a wireless connection, for example, a short-range Bluetooth connection. Those persons skilled in the art will recognize and understand that any of various types of electronic signal connections or transmission devices may be utilized.

With further reference to FIGS. 5 and 6, the operation of the system 10 of the illustrated embodiments of the present invention according to the contemplated methodology may be understood. FIGS. 5 and 6 depict a circumstance corresponding to that of FIGS. 1 and 3 wherein the ground surface S is unobstructed for excavation, but a locator mark M obtained from conventional above-ground locating techniques using known equipment is inaccurate by a slight horizontal offset from directly vertically above an underground utility line U to be located. As will be understood, however, the operation of the present system according to the present methodology would be carried out identically in a circumstance in which an above-ground obstruction, such as a concrete pad as represented in FIGS. 2 and 4, prevents excavating directly downwardly from an above-ground mark M (in such instances, the ground is typically also marked with an indicator that indicates the direction and distance to the above-ground position actually believed to be directly overhead the utility).

An excavation E is made vertically downwardly from the locator mark M and, upon reaching the expected depth of the utility line U, the excavation necessarily misses the utility line U due to the inaccuracy of the mark M. The operator connects receiver 12 to receiver 14 via communication connection 16 and then, while standing above-ground, deploys receiver 12 downwardly into the excavation E via arm 24 until an electromagnetic field emitted by and surrounding utility line U (resulting, as discussed above, from a passive signal already present on the utility or from a signal actively applied to the utility by the user prior to the location procedure) induces an electrical current upon coil 20 (FIGS. 5A and 6A) or upon one or both of coils 18, 20 (FIGS. 5B and 6B). Recall, as discussed above, that since the user has selected a frequency for which above-ground locator 14 is used to search for utility signals, and since the signals from in-ground receiver 12 are directed to the same processing circuitry, the system utilizing below in-ground receiver 12 searches for signals of the same frequency as the signals for which receiver 14 was used to search aboveground, without need to reset the system's operation.

In the depiction of FIG. 5A, the operator has connected the output line 16 (not shown) from housing 22/coil 20 of remote locator 12 to above-ground locator 14. As described above, this causes CPU 32 to switch multiplexer 34 so that the CPU receives the output of coil 20 and not the output of the coils in above-ground locator 14, and to drive display 52 in the above-ground locator to display an image or an audio signal corresponding to the intensity of the signal received from coil 20 (e.g. by a bar graph that varies in height or length directly with the received signal intensity, and/or an audible signal that varies in volume directly with signal intensity). In the position of remote locator 12 indicated at the left in FIG. 6A, coil 20 is not yet in sufficient proximity to electromagnetic field F emanating from utility line U for field F to induce an electric current in coil 20 detectable by CPU 32 when transmitted from locator 12 to locator 14 as described above, or is in a position that a detectable signal is just initially detected and visibly or audibly displayed at display 52. The programming of CPU 32 may provide an option to the user at the user interface at screen 52 to actuate a button to selectively increase or decrease the gain applied by processing circuitry 38 (FIGS. 7A and 7B) during use so that the user may control the system's sensitivity to the received signals, for example to reduce the system's sensitivity to undesired signals or to prevent saturation. At the point in the descent of housing 22 vertically into excavation E (assume the operator initially holds the locator so that it is generally centrally located in the excavation) where display 52 first displays a signal magnitude originating from coil 20, the operator then lowers housing 22 further into the excavation, until display 52 displays a null value for the antenna output, in the position shown in FIG. 5A. This indicates that coil 20 is horizontally level with utility U, and thereby informs the operator of the utility's depth.

Note that if the utility is disposed at a non-zero angle with respect to horizontal, horizontal antenna 20 will still detect a null when the antenna is horizontally even with the antenna. A vertical antenna 18 will likewise still detect a maximum signal at that position, albeit at a lower intensity than would be the case if the utility is at a non-zero angle with respect to horizontal. Similarly, antenna 20 will still detect a null when the angle between the antenna's axis and the utility axis in the horizontal plane is less than 90°, although if the axis of antenna 20 is at or close to parallel on the utility axis, and if the utility axis is at or near vertical (an unlikely condition), antenna 20 may not detect a null. If the user deploys the in-ground receiver 12 into the excavation and cannot detect a null (which may be a full null, with no signal level, or a signal trough), the user may then rotate the detector, and therefore rotate antenna 20, about the vertical axis (e.g. of arm 24) incrementally and move receiver 12 up and down in the excavation until locating a null.

Having identified the utility's depth, the user moves housing 22 up in excavation E, e.g. to the level as indicated at FIG. 6A, to determine the utility's lateral orientation with respect to receiver 12 (i.e. the horizontal direction in which utility U lies with respect to the in-ground locator/receiver). More specifically, the operator manipulates arm 24, and therefore housing 22 and coil 20, so that housing 22 and coil 20 move horizontally within the excavation bore. Not knowing how excavation E might be located with respect to the utility, the operator moves housing 22 horizontally in several different directions, while simultaneously monitoring the information provided by display 52. With reference to FIG. 6A, for example, if the operator moves housing 22 from the indicated left position to the indicated right position, with coil 20 oriented so that the movement of coil 20 and housing 22 is along axis 20a of coil 20, the signal magnitude at display 52 increases because the magnitude of the component of emitted magnetic field F that is parallel or tangential to the axis of coil 20 gets stronger when the coil is moved in that left-to-right sequence. On the other hand, if the operator moves housing 22 from the illustrated right position to the illustrated left position, again along coil axis 20a, the signal magnitude displayed at 52 decreases. In the context of the arrangement shown in FIG. 6A, the operator therefore knows that utility U is located to the right of excavation E. In reality, utility U may be located anywhere about a 360° range about excavation E. Thus, the operator makes several horizontal movements of coil 20 and housing 22, back and forth in several horizontal directions. For each movement, the operator rotates coil 20 about the vertical axis (adjusting the coil's yaw) through manipulation of arm or pole 24, or rotation of pole 24 about its axis if pole 24 is straight, so that each horizontal movement is along coil axis 20a. Markings may be provided on housing 22 and/or pole 24 indicating the orientation of axis 20a, so that the operator can rotate pole 24 to align coil 20 in the desired orientation for each horizontal movement. Each horizontal movement results in an increase or decrease of the signal magnitude displayed (e.g. in a bar graph of signal intensity) at 52. The operator identifies which movement results in the largest signal magnitude at display 52 at the movement's end, in that this movement's direction indicates the utility's horizontal direction with respect to the excavation.

It will be understood that if the operator has opened excavation E directly above the utility, but simply has not opened excavation E to a depth sufficient to reach the utility the operator will be unable to achieve a null, but since display 52 shows a maximum signal in a central region of the excavation, the operator is informed that the excavation is indeed directly above the utility.

Based on the null identification in the initial insertion of the in-ground receiver into excavation E as in FIG. 5A, and on the horizontal test movements, back and forth, as in FIG. 6A, the operator knows not only the depth but, also, the horizontal direction of the utility with respect to the excavation. The operator may therefore continue the excavation in the appropriate direction to expose or otherwise reach the utility. If the operator has not dug excavation E to a sufficient depth, the operator can determine that difficulty upon failing to obtain a null. Thus, the operator can continue to dig the excavation and either locate the utility via the dig or, after stopping the dig, locating the utility's depth and direction via the procedure discussed above with respect to FIGS. 6A and 6B.

The system's operation in the configuration of FIGS. 5B and 6B is the same as that described above with respect to the configuration of FIGS. 5A and 6A, except that display 52 also has the capability to display the signal magnitude of vertical coil 18, in addition to the magnitude of horizontal coil 20. As noted above, the user interface of receiver 14 presents the operator an option to select the output of either antenna 20 or antenna 18 to direct to CPU 32. Assuming that the operator first selects antenna 20, the operator lowers in-ground receiver 12 into excavation E (with antenna 20 aligned with its coil axis horizontal, as shown) until display 52 shows that the output of antenna 20 is a null. At this point, the operator knows that receiver/locator 12's depth is even with the utility's depth, thereby identifying the utility's depth. Maintaining in-ground receiver 12 at this position, the user actuates the user interface of above-ground receiver/ locator 14 to disable the output of antenna 20 to CPU 32 and direct the output of vertical antenna 18 to CPU 32. The operator then manipulates arm 24, and therefore housing 22 and coil 18, so that housing 22 and coil 18 move horizontally within the excavation bore, as indicated in FIG. 6B. Not knowing how excavation E might be located with respect to the utility, the operator moves housing 22 horizontally in several different directions, while simultaneously monitoring the information provided by display 52. With reference to FIG. 6B, if the operator moves housing 22 from the indicated left position to the indicated right position, with coil 18 oriented so that the movement of coil 18 and housing 22 is perpendicular to axis 18a of coil 18, the signal magnitude at display 52 increases because the antenna 18 is moving closer to utility U, so that emitted magnetic field F gets stronger when the coil is moved in that left-to-right sequence. On the other hand, if the operator moves housing 22 from the illustrated right position to the illustrated left position, again perpendicular to axis 18a, the signal magnitude displayed at 52 decreases. In the context of the arrangement shown in FIG. 6B, the operator therefore knows that utility U is located to the right of excavation E. In reality, utility U may be located anywhere about a 360° range about excavation E. Thus, the operator makes several horizontal movements of coil 18 and housing 22, back and forth in several horizontal directions. Each horizontal movement results in an increase, decrease, or lack of change of the signal magnitude displayed at 52. The operator identifies which movement results in the largest signal magnitude at display 52 at the movement's end, in that this movement's direction indicates the utility's horizontal direction with respect to housing 22 and the excavation.

Again, if the operator has failed to dig the excavation to a sufficient depth, the receiver will not detect the null at the initial extension of housing 22 into the excavation, and the excavation can be taken to a deeper depth and the process repeated.

In a still further embodiment display 52 simultaneously displays the signal magnitude of vertical coil 18 and the magnitude of horizontal coil 20. The operator may therefore step through the above-described procedure while examining the one signal magnitude or the other on display 52, without needing to interact with a user interface of in-ground receiver 12 to switch from one antenna to the other.

It is contemplated within the scope of the present invention that above-ground receiver 14 may be equipped with an antenna configuration and corresponding programming to extrapolate from the detected electrical current signals from the antenna of locator receiver 14 a dimensional distance from the utility line U. The electronic design and programming of such capabilities is not herein further described or illustrated.

The locating system and methodology provided by these embodiments enables above-ground personnel to locate underground utility lines without undue excavation and without the inconvenience and impracticality of personnel having to enter the excavation. The system is operable from above-ground and may be conveniently embodied in a dedicated single-purpose system or incorporated into and used with substantially any conventional above-ground locator unit.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A method for locating an underground utility that emits an electromagnetic field generally coaxially about the underground utility within a signal range thereabout, from an excavation proximate the utility, the method comprising:
    disposing above ground a locator having a display, a plurality of first antennas, and circuitry in communication with the plurality of first antennas and the display, wherein
    each first antenna of the plurality of first antennas disposed in the locator so that the electromagnetic field induces a first signal in the first antenna that varies in a predetermined manner depending on a first spatial relationship between the first antenna and the utility, and
    the locator circuitry is in communication with the plurality of first antennas so that the locator circuitry receives respective said first signals induced on the plurality of first antennas and drives the display to present a human detectable presentation corresponding to a characteristic of one or more said first signals induced on respective one or more of the plurality of first antennas;
    providing a second antenna that is configured so that the electromagnetic field induces a second signal in the second antenna that varies in a predetermined manner depending on a second spatial relationship between the second antenna and the utility, wherein the second antenna is in communication with the locator circuitry so that the second antenna outputs to the locator circuitry a measurement signal corresponding to the second signal, wherein the locator circuitry is configured to drive the display to present a human detectable presentation corresponding to a characteristic of the measurement signal that varies with variation in the second spatial relationship; and
    lowering the second antenna into the excavation and conveying the measurement signal to the locator until the presentation of the measurement signal characteristic indicates that the second antenna is at a predetermined spatial relationship with respect to the underground utility.

2. The method as in claim 1, wherein the providing step comprises providing a suspension to the second antenna that supports the second antenna.

3. The method as in claim 2, wherein a user, in the lowering step, stands above-ground, proximate the excavation, holds the suspension, and lowers the second antenna into the excavation by the suspension.

4. The method as in claim 3, wherein the suspension is an elongated rigid rod.

5. The method as in claim 1, wherein the second antenna is a coil antenna having an axis and wherein the axis is horizontal during the lowering step.

6. The method as in claim 5, wherein the lowering step comprises, when the display indicates detection of the electromagnetic field, moving the second antenna horizontally, in a direction along the coil antenna axis, and determining whether the measurement signal increases or decreases based on the presentation of the measurement signal characteristic.

7. The method as in claim 1, wherein the conveying step comprises wirelessly conveying the measurement signal.

\* \* \* \* \*